US012168350B2

(12) United States Patent
Suzuki et al.

(10) Patent No.: US 12,168,350 B2
(45) Date of Patent: Dec. 17, 2024

(54) MIST COLLECTING UNIT, AND AN INKJET PRINTING APPARATUS HAVING SAME

(71) Applicant: SCREEN HOLDINGS CO., LTD., Kyoto (JP)

(72) Inventors: Yuto Suzuki, Kyoto (JP); Masahiro Tokuyama, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 195 days.

(21) Appl. No.: 17/866,197

(22) Filed: Jul. 15, 2022

(65) Prior Publication Data

US 2023/0095538 A1 Mar. 30, 2023

(30) Foreign Application Priority Data

Sep. 24, 2021 (JP) ................................ 2021-155333

(51) Int. Cl.
*B41J 2/165* (2006.01)
*B41J 2/17* (2006.01)

(52) U.S. Cl.
CPC ........... *B41J 2/1652* (2013.01); *B41J 2/1714* (2013.01); *B41J 2/1721* (2013.01); *B41J 2/1728* (2024.05)

(58) Field of Classification Search
CPC . B41J 2/1714; B41J 2/1721; B41J 2002/1728
See application file for complete search history.

(56) References Cited

U.S. PATENT DOCUMENTS

2020/0269585 A1* 8/2020 Izawa ...................... B41J 2/185

FOREIGN PATENT DOCUMENTS

JP 2012192657 A * 10/2012
JP 5994616 B2 9/2016
JP 2017056590 A * 3/2017
JP 2018001729 A * 1/2018

* cited by examiner

*Primary Examiner* — Sharon Polk
(74) *Attorney, Agent, or Firm* — Rimon P.C.

(57) ABSTRACT

A mist collecting unit for collecting a mist of ink droplets. The mist collecting unit includes the following elements. An introduction pipe, a mist introducing box with the introduction pipe mounted to have an upper part open, and a collecting box attached to a lower part of the mist introducing box. The gas is introduced from the introduction pipe into the collecting box, thereby capturing the mist included in the gas by inner surfaces of the collecting box.

20 Claims, 8 Drawing Sheets

MIST COLLECTING UNIT, AND AN INKJET PRINTING APPARATUS HAVING SAME

BACKGROUND OF THE INVENTION

(1) Field of the Invention

This invention relates to a mist collecting unit for collecting a mist of ink droplets, and to an inkjet printing apparatus having same.

(2) Description of the Related Art

Conventionally, a known apparatus of this type collects ink droplets along with mist when carrying out a blind dispensation of ink droplets. See Japanese Patent No. 5994616, for example.

This apparatus includes a dispensed droplet introduction passage, a mist flow attenuation passage, and a mist receiving space. The dispensed droplet introduction passage introduces droplets and mist from a droplet inlet. The mist flow attenuation passage has a flow reflecting surface opposed to a slope, and attenuates the energy of the droplets by making the droplets introduced from the dispensed droplet introduction passage collide with the slope and the flow reflecting surface. The mist is collected in the mist flow attenuation passage and mist receiving space. The mist flow attenuation passage and mist receiving space are formed, in plan view, longitudinally of the droplet inlet on opposite sides across the droplet inlet. Suction is exerted into the mist receiving space from the longitudinal direction along the slope and flow reflecting surface of the mist flow attenuation passage.

However, the conventional example with such construction has the following problem.

The conventional apparatus carries out reversal of the flow in the short course of the flow attenuation passage a plurality of times, and this process results in the mist easily captured on the slope and the flow reflecting surface. Since the mist tends to adhere particularly in the flow reversing locations, the mist adhesion is concentrated in narrow areas. Consequently, pressure loss gradually increases in the mist flow attenuation passage, the flow decreases, the capability to capture the mist lowers, and the mist collecting efficiency lowers. In other words, there arises a problem that the collecting efficiency cannot be maintained over a long period of time. When the mist collecting efficiency lowers, the mist will adhere to and contaminate other parts of the apparatus, causing failure of the apparatus or requiring excessive time for maintenance. The frequency of maintenance may also be increased.

SUMMARY OF THE INVENTION

This invention has been made having regard to the state of the art noted above, and its object is to provide a mist collecting unit which can maintain mist collecting efficiency over a long period of time, and an inkjet printing apparatus having such mist collecting unit.

To fulfill the above object, this invention provides the following construction.

This invention provides a mist collecting unit for collecting a mist of ink droplets, the mist collecting unit comprising an introduction pipe for introducing a gas including the mist; a mist introducing box including an open bottom, and a suction port formed adjacent one end in a longitudinal direction thereof, with the introduction pipe mounted adjacent the other end in the longitudinal direction to have an upper part opening in a ceiling plane; and a collecting box attached to a lower part of the mist introducing box to have an open ceiling surface, a bottom spaced from a lower end of the introduction pipe, and inner side surfaces spaced from outer side surfaces of the introduction pipe; wherein the gas is introduced from the introduction pipe into the collecting box by sucking internal atmosphere of the mist introducing box and the collecting box from the suction port, thereby capturing the mist included in the gas by inner surfaces of the collecting box.

According to this invention, the mist included in the gas introduced from the lower end of the introduction pipe is captured by the bottom of the collecting box, and by the inner side surfaces of the collecting box existing in the entire circumference of the introduction pipe in plan view. Consequently, since the capturing area can be increased as compared with the conventional area, the mist can be captured in a thin large area. Since the flow path is restrained from becoming narrow, the flow rate of the air stream can be maintained substantially constant. As a result, mist collecting efficiency can be maintained over a long period of time.

In this invention, it is preferred that the mist collecting unit further comprises a space defined by the mist introducing box and the collecting box between an outer surface adjacent the suction port in the longitudinal direction, among the outer surfaces of the introduction pipe, and the suction port; a first member erected in the space; and a second member located in the space closer in the longitudinal direction to the suction port than the first member; wherein the first member is provided in a state that a side surface thereof is spaced from an outer side surface of the introduction pipe and a height of an upper end of the first member is higher than a height of the lower end of the introduction pipe, and is provided on the bottom of the collecting box to have an upper end thereof spaced from the ceiling plane of the mist introducing box; and the second member is suspended from the ceiling plane of the mist introducing box to have a lower end thereof spaced from the bottom of the collecting box, and a height of the lower end lower than the height of the upper end of the first member.

With the first member and second member arranged in the space, the first member and second member can further capture the mist by the time the air stream arrives at the suction port. Thus, the mist collecting efficiency can be further improved.

In this invention, it is preferred that a distance d between the outer surface of the introduction pipe and an inner surface of the collecting box opposed to the outer surface of the introduction pipe is distance $d=2\cdot d1$, where d1 is an interval between the lower end of the introduction pipe and the bottom of the collecting box.

With the above dimensions, the collecting box can easily capture the mist as concerns gas currents introduced through the introduction pipe and flowing upward to spread around from the bottom of the collecting box.

In this invention, it is preferred that a distance d between the outer surface of the introduction pipe and an inner surface of the collecting box opposed to the outer surface of the introduction pipe, and the distance d in the longitudinal direction between the outer surface of the introduction pipe and the first member, is distance $d=2\cdot d1$, where d1 is an interval between the lower end of the introduction pipe and the bottom of the collecting box.

With the above dimensions, the collecting box and the first member can easily capture the mist as concerns gas currents introduced through the introduction pipe and flowing upward to spread around from the bottom of the collecting box.

In this invention, it is preferred that the collecting box is attachable to and detachable from the mist introducing box by a ball catch, the ball catch including a female part having a pair of biased spherical members arranged opposite each other in a recess, and a male part having an engaging member for engaging the recess.

The ball catch allows the collecting box to be easily attached to and detached from the mist introducing box. Consequently, maintenance can be carried out easily. Further, since a hose is attached to the introduction pipe side (mist introducing box as the fixed side), there is no trouble of attaching and detaching the hose, which allows for easy attachment and detachment.

In this invention, it is preferred that the collecting box has sheets of paper spread to cover a bottom surface and side surfaces thereof.

The collecting box can be cleaned quickly by changing the sheets of paper in the collecting box. Consequently, maintenance can be carried out in a short time.

In another aspect of this invention, an inkjet printing apparatus is provided for performing printing on a printing medium by dispensing ink droplets thereto, the apparatus comprising transport rollers for transporting the printing medium; print heads for dispensing the ink droplets to the printing medium transported by the transport rollers; and a mist collecting unit disposed at an end of each of the transport rollers for collecting mist accompanying the ink droplets dispensed from each of the print heads;

the mist collecting unit including an introduction pipe for introducing a gas including the mist; a mist introducing box including an open bottom, and a suction port formed adjacent one end in a longitudinal direction thereof, with the introduction pipe mounted adjacent the other end in the longitudinal direction to have an upper part opening in a ceiling plane; and a collecting box attached to a lower part of the mist introducing box to have an open ceiling surface, a bottom spaced from a lower end of the introduction pipe, and inner side surfaces spaced from outer side surfaces of the introduction pipe; wherein the gas is introduced from the introduction pipe into the collecting box by suction from the suction port, thereby capturing the mist included in the gas by inner surfaces of the collecting box.

According to this invention, the mist accompanying the ink droplets dispensed from print heads drifts over the upper surface of the printing medium transported by the transport rollers. This mist is borne on the gas and is introduced from the introduction pipe. The mist is captured by the bottom of the collecting box and the inner side surfaces of the collecting box which exist in the entire circumference of the introduction pipe in plan view. Consequently, since the capturing area can be increased as compared with the conventional area, the mist can be captured in a thin large area. Since the flow path is restrained from becoming narrow, the flow rate of the air stream can be maintained substantially constant. As a result, mist collecting efficiency can be maintained over a long period of time. Downtime due to maintenance can be shortened and the operating rate can be improved.

In this invention, it is preferred that, when the printing medium of various width dimensions is transported in a state of one end in a width direction of the printing medium is close to one end in a longitudinal direction of the transport roller acting as reference, the mist collecting unit is located adjacent the other end of the transport roller.

When printing is done on printing media of various width dimensions, the mist collecting units can be operated appropriately.

In this invention, it is preferred that, when the printing medium of maximum width is transported in plan view, the mist collecting unit has at least part of the introduction pipe located outward of the end of the printing medium adjacent the other end.

When printing is done on a printing medium of maximum width, the mist collecting units can be operated appropriately.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

Preferred embodiments of this invention will be described in detail hereinafter with reference to the drawings.

One embodiment of this invention will be described hereinafter with reference to the drawings.

<1. Overall Construction>

Figure 1:
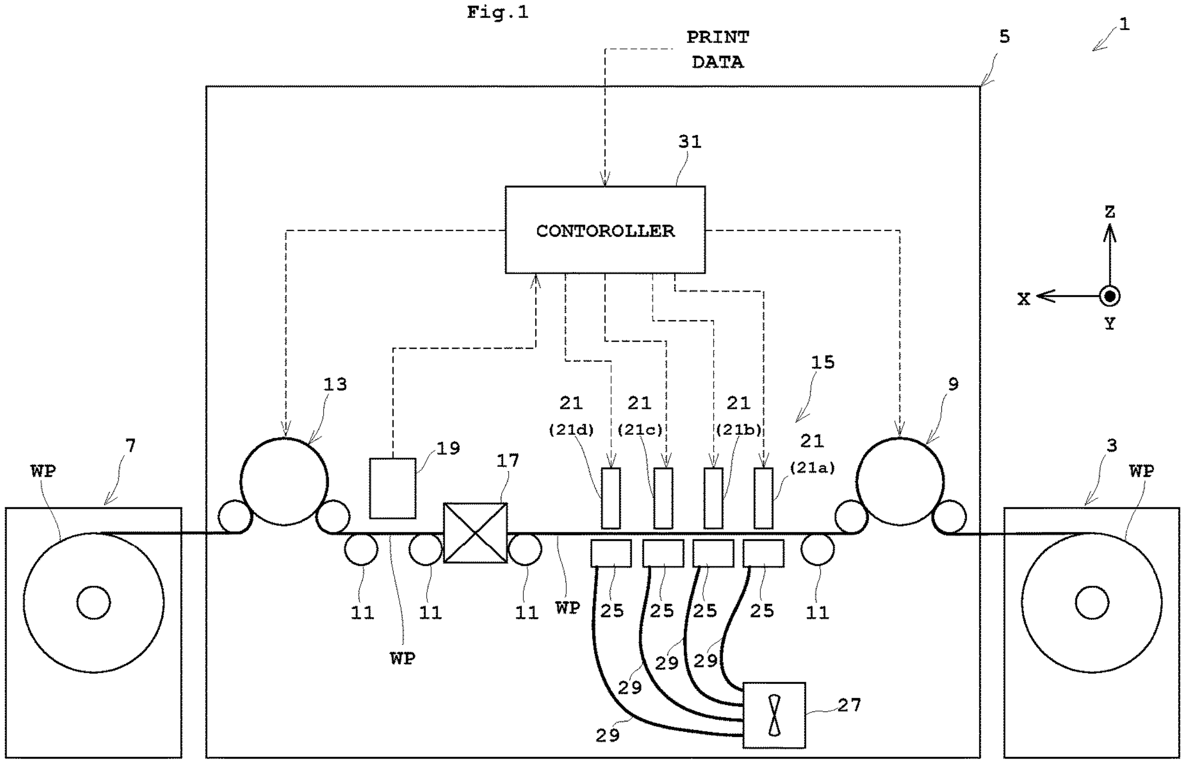
FIG. 1 is a view showing an overall construction of an inkjet printing system according to an embodiment.
Figure 2:
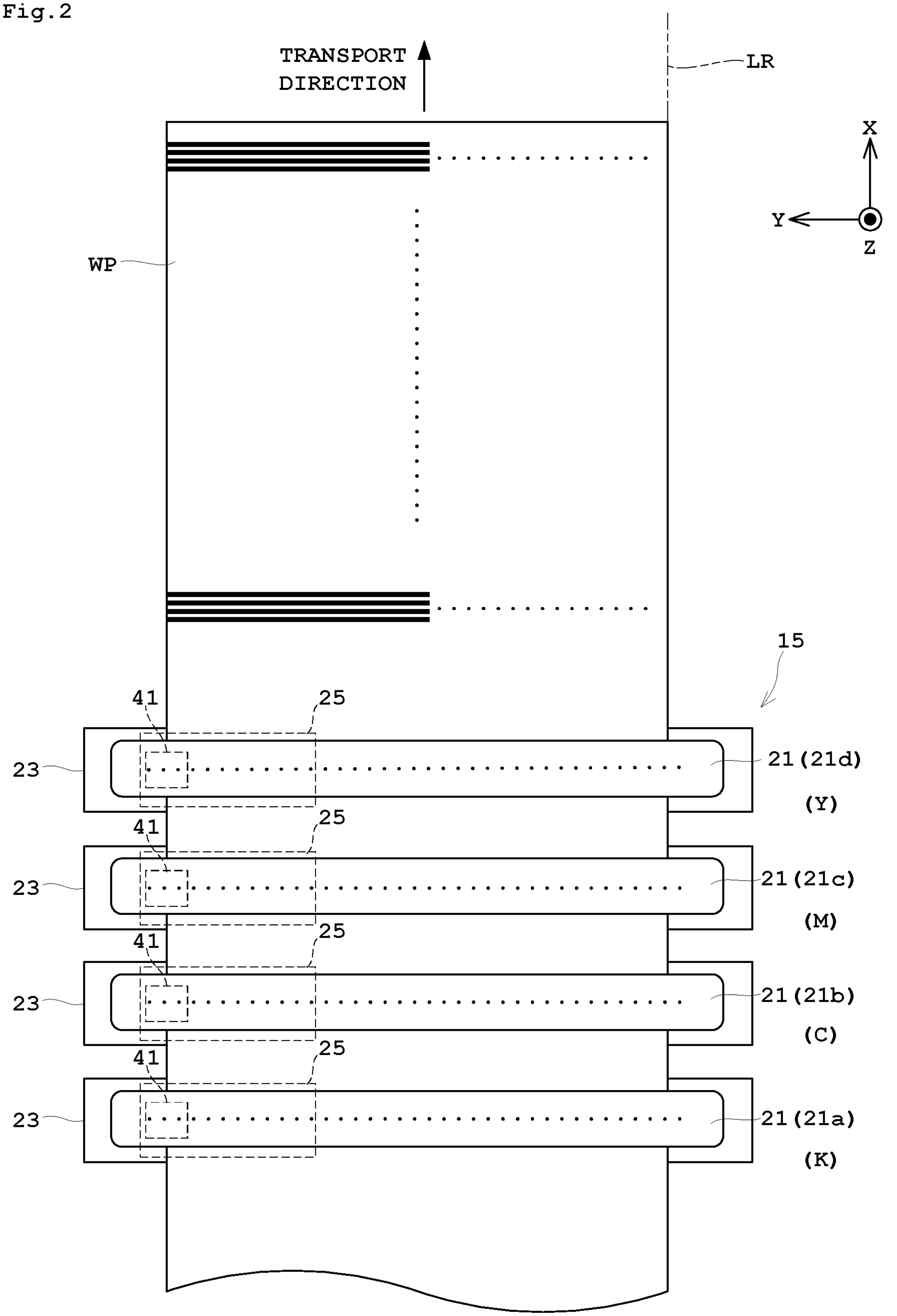
FIG. 2 is a plan view showing a positional relationship between a print head/a plurality of head units, and web paper.

FIG. 1 is a view showing an overall construction of an inkjet printing system according to an embodiment. FIG. 2 is a plan view showing a positional relationship between a print head, a plurality of head units, and web paper.

An inkjet printing system 1 according to this embodiment includes a paper feeder 3, an inkjet printing apparatus 5 and a takeup roller 7.

The paper feeder 3 holds web paper WP in a roll form to be rotatable about a horizontal axis, for example. The paper feeder 3 unwinds and feeds the web paper WP to the inkjet printing apparatus 5. The takeup roller 7 takes up on a horizontal axis the web paper WP printed in the inkjet printing apparatus 5. Referring to the side of feeding the web paper WP as upstream and that of discharging the web paper WP as downstream, the paper feeder 3 is located upstream of the inkjet printing apparatus 5, and the takeup roller 7 downstream of the inkjet printing apparatus 5.

Assume here that the direction in which the web paper WP is transported from the paper feeder 3 to the takeup roller 7 is a transport direction X (secondary scanning direction). The direction of depth from the plane of FIG. 1, which is horizontal and perpendicular to the transport direction X of web paper WP, is assumed to be a width direction Y (primary scanning direction). The direction perpendicular to the transport direction X and width direction Y is assumed to be a height direction Z.

The inkjet printing apparatus 5 includes a drive roller 9 disposed in an upstream position in the transport direction X for taking in the web paper WP from the paper feeder 3. The web paper WP unwound from the paper feeder 3 by the drive roller 9 is transported from upstream to downstream along a plurality of transport rollers 11. A drive roller 13 is disposed between the most downstream transport roller 11 and the takeup roller 7. The drive roller 13 transports the web paper WP transported in the transport direction X on the transport rollers 11, and feeds the web paper WP forward toward the takeup roller 7.

The above web paper WP corresponds to the "printing medium" in this invention.

The inkjet printing apparatus 5 includes, between the drive roller 9 and drive roller 13, a printing unit 15, a dryer 17, and an inspecting unit 19 arranged in the stated order from upstream to downstream in the transport direction X. The dryer 17 dries images printed by the printing unit 15. The inspecting unit 19 reads printed portions, and inspects by image processing to check whether print areas have stains, omissions or other defects.

The printing unit 15 is disposed as spaced in the height direction Z from the transport path of web paper WP provided by the transport rollers 11. The printing unit 15 includes print heads 21 for dispensing ink droplets to the web paper WP. Each print head 21 has a plurality of dispensing bores (not shown) arranged in a dispensation area thereof for dispensing the ink droplets. The dispensation area of each print head 21 is located in a lower surface thereof opposed to the web paper WP. This embodiment describes a construction including four print heads 21, for example. Each print head 21 has a long axis extending in the width direction Y. Each print head 21 has a length exceeding the width of the web paper WP to be capable of printing over the entire width of the web paper WP.

In this embodiment, the print heads 21 are constituted of a print head 21*a*, a print head 21*b*, a print head 21*c*, and a print head 21*d* arranged in order from an upstream side in the transport direction X adjacent the paper feeder 3 to a downstream side in the transport direction X adjacent the takeup roller 7. In this specification, where the print heads 21 need to be distinguished, signs (such as "a") will be affixed to sign 21, but where it is not necessary to distinguish them, only sign 21 will be used. The print heads 21*a*-21*d* dispense ink droplets in at least two colors to enable multicolor printing on the web paper WP. Here, for example, the print head 21*a* dispenses black (K) ink, the print head 21*b* dispenses cyan (C) ink, the print head 21*c* dispenses magenta (M) ink, and the print head 21*d* dispenses yellow (Y) ink. The print heads 21*a*-21*d* are arranged at predetermined intervals along the transport direction X.

A unit frame 23 is disposed below each print head 21 in the height direction Z. The unit frame 23 is located at a predetermined distance below each print head 21. The unit frame 23 is attached, for example, to an apparatus frame (not shown) to which the transport rollers 11 are rotatably attached. The unit frame 23 is slightly longer than the length in the width direction Y of each print head 21. The unit frame 23 has a width slightly larger than the width in the transport direction X of each print head 21.

The unit frame 23 has a mist collecting unit 25. The mist collecting unit 25 collects a mist of ink droplets dispensed from each print head 21. The mist collecting unit 25 sucks a gas including the mist of ink droplets and collects the mist.

The inkjet printing apparatus 3 includes a fan box 27, for example. The fan box 27 houses a fan for sucking the gas. The fan box 27 is connected to all the mist collecting units 25 with individual hoses 29. The hoses 29 directly connect the mist collecting units 25 and fan box 27. The hoses 29 circulate the gas from the mist collecting units 25.

The place where the ink jet printing system 1 is installed may have a utility device for sucking and exhausting gas to the exterior of the inkjet printing apparatus 5. In this case, the hoses 29 may be connected to the utility device instead of the fan box 27.

The inkjet printing apparatus 3 includes a controller 31. The controller 31 has a CPU and a memory not shown. The controller 31 receives print data from an external computer not shown. The controller 31, after converting the print data into data for printing processes, operates the drive rollers 9 and 13 to transport the web paper WP in the transport direction X. The controller 31 causes ink droplets to be dispensed from the print heads 21 according to the data for printing processes. Thus, the controller 31 causes images based on the print data to be printed on the web paper WP.

As shown in FIG. 2, the web paper WP is set according to a reference line LR. The reference line LR is provided for one end in the width direction Y, for example. In this embodiment, the end on the right-hand side as seen from upstream in the transport direction X provides the reference line LR. The web paper WP is available in various width dimensions. The web paper WP chosen and set is one of those having widths accommodating various print data and specifications of final prints. In that case, the web paper WP is set to have the end thereof coinciding with the reference line LR.

FIG. 2 shows a state where the web paper WP of the largest width that can be printed by this inkjet printing system 1 is set. Even in this state, the mist collecting units 25 are arranged in positions where part of through holes 41 communicating with the mist collecting units 25 described hereinafter are exposed. In other words, even in the state where the web paper WP of the largest width is used, at least part of suction ports 49 of the mist collecting units 25 open outward of an end of the web paper WP opposite from the reference line LR. Consequently, the mist collecting units 25 can collect the mist whatever width the set web paper WP may have. In other words, when printing is done on the web paper WP of various width dimensions, or on a printing medium of maximum width, the mist collecting units 25 can be operated appropriately.

Incidentally, when the web paper WP with a width narrower than the largest width is set, the controller 31 does not give instructions for dispensation of ink droplets based on print data as regards locations where the web paper WP does not exist. However, the controller 31 gives instructions for dispensation of ink droplets based on predetermined data as regards locations where the web paper WP does not exist. This is done in order to avoid a situation where a long non-dispensation time makes the condition of the dispensing bores of the print heads 21 become different from that of other parts, which would cause an uneven printing quality.

<2. Construction of Mist Collecting Unit>

Figure 3:
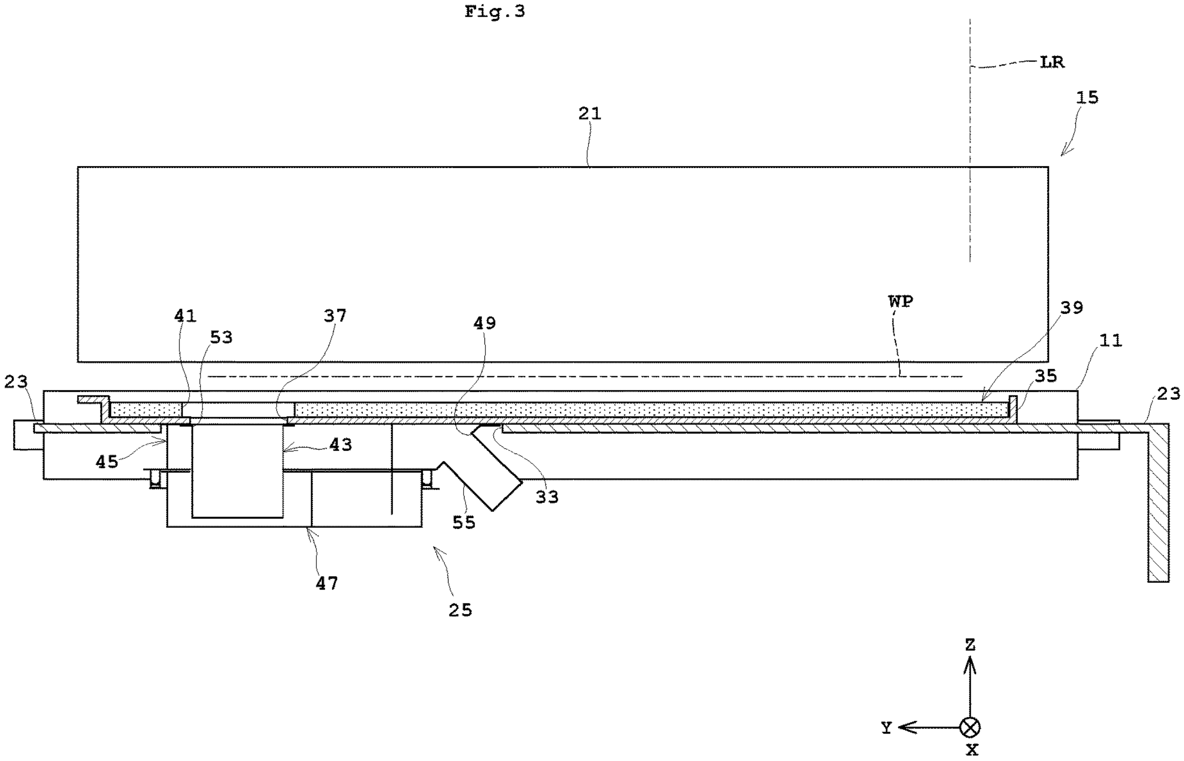
FIG. 3 is a view in vertical section of a mist collecting unit seen from upstream in a transport direction.
Figure 4:
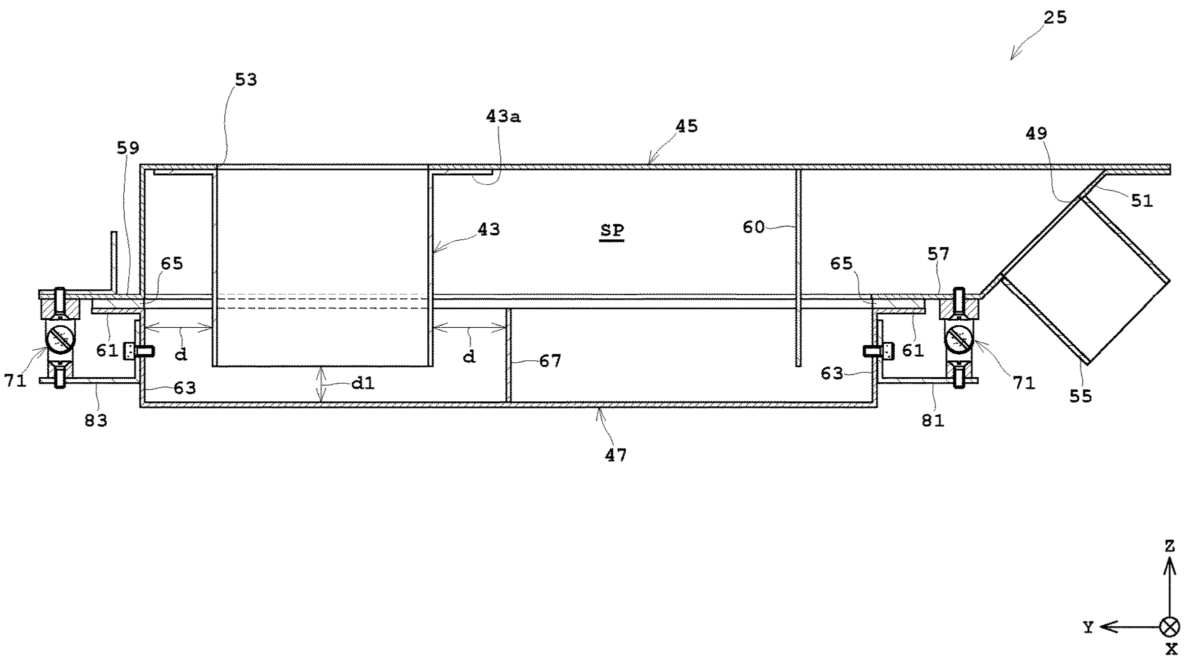
FIG. 4 is a view in vertical section showing details of the mist collecting unit.

Reference is made here to FIGS. 3 and 4. FIG. 3 is a view in vertical section of a mist collecting unit seen from upstream in the transport direction. FIG. 4 is a view in vertical section showing details of the mist collecting unit.

Each unit frame 23 has a mounting recess 33 formed in one region thereof. The mounting recess 33 penetrates the unit frame 23 to be formed in upper and lower surfaces thereof. A tray 35 is mounted on the upper surface of the unit frame 23 and under the print head 21. The tray 35 assumes a depressed shape. The tray 35 has a length in the width direction Y slightly longer than an effective length of the print head 15. Here, the effective length is not a profile length in the width direction Y of the print head 15. The effective length is a length in the width direction Y of a spew area for dispensing ink droplets in the width direction Y of the print head 15. The tray 35 is mounted on the upper surface of the unit frame 23 under the print head 15 to include opposite ends of the effective length of the print head 15. The tray 35 has an opening 37 formed in a bottom surface thereof. The tray 35 is mounted on the unit frame 23 to have the opening 37 located inside the mounting recess 33 in plan view. The opening 37 has an area in plan view smaller than the area of the mounting recess 33.

The tray 35 has a sponge 39. The sponge 39 is a porous material. The sponge 39 has a property to absorb ink droplets. The sponge 39 has a through hole 41 formed in a position thereof corresponding to the opening 37. The through hole 41 has an area slightly larger than the opening 37 in plan view. The sponge 39 is located on the tray 35 to have the through hole 41 embrace the opening 37 in plan view.

A mist collecting unit 25 is attached to the lower surface of the unit frame 23. Specifically, the mist collecting unit 25 is attached to the mounting recess 33 of the unit frame 23. The mist collecting unit 25 includes an introduction pipe 43, a mist introducing box 45, and a collecting box 47. The mist introducing box 45 and collecting box 47 define a space SP. The mist collecting unit 25 has a long axis in the width direction Y. The mist collecting unit 25 is attached to the unit frame 23 so that the long axis be in agreement with the width direction Y.

The introduction pipe 43 assumes a hollow shape. The introduction pipe 43 has a cross section that assumes a rectangular shape, for example. The introduction pipe 43 may have a cylindrical body with a circular cross section. The introduction pipe 43 introduces a gas (air) including the ink droplets dispensed from the print head 21 and a mist of the ink droplets. The gas flows through the introduction pipe 43 in the height direction Z. The introduction pipe 43 has a bent portion 43*a* formed thereon, for example. The bent portion 43*a* is formed by bending outward an upper end of the introduction pipe 43. The introduction pipe 43 projects into the space SP.

The mist introducing box 45 has an open bottom and a ceiling surface. The mist introducing box 45 has a suction port 49 formed adjacent one end in the width direction Y thereof. The suction port 49 is formed in a side panel 51 of the mist introducing box 45. More particularly, the suction port 49 is formed in a sloping surface of the side panel 51.

The mist introducing box 45 has an introduction hole 53 formed therein. The introduction hole 53 is formed in the ceiling surface of the mist introducing box 45. The introduction hole 53 is formed adjacent the other end in the width direction Y of the mist introducing box 45. In other words, the introduction hole 53 is formed in the opposite side in the width direction Y from the suction port 49. The introduction hole 53 has much the same aperture area as the opening 37 of the tray 35. The mist introducing box 45 is fitted in the mounting recess 33 of the unit frame 23 so that the introduction hole 53 be in agreement with the opening 37 of the tray 35 in plan view.

The suction port 49 has a suction pipe 55 attached thereto. The suction pipe 55 has one end thereof attached to the side panel 51. The suction pipe 55 is attached in such a posture as having a centerline thereof intersecting perpendicular to the slope of the side panel 51. The suction pipe 55 has one of the hoses 29 connected to the other end thereof.

The mist introducing box 45 has the introduction pipe 43 attached to the ceiling surface thereof. Specifically, the introduction pipe 43 has the bent portion 43*a* attached to the ceiling surface of the mist introducing box 45. The introduction pipe 43 is attached in such a way that the introduction hole 53 and inner side surfaces of the introduction pipe 43 are in agreement in plan view.

The mist introducing box 45 has a horizontal plate 57. The horizontal plate 57 extends from the slope of the side panel 51 to the other end in the width direction Y. The horizontal plate 57 forms part of the bottom of the mist introducing box 45. The mist introducing box 45 has an extension 59 on the other end side in the width direction Y. The extension 59 is extended horizontally in the width direction Y from an outer side surface of the mist introducing box 45.

The mist introducing box 45 has a suspended plate 60. The suspended plate 60 projects to the space SP. The mist introducing box 45 has the suspended plate 60 attached to the ceiling surface. The suspended plate 60 is attached between the introduction hole 53 and suction port 49 in the width direction Y. More particularly, the suspended plate 60 is attached in a position closer to the suction port 49 than to the introduction hole 53. The suspended plate 60 does not form gaps with inner side surfaces of the mist introducing box 45 when seen from the width direction Y. In other words, the suspended plate 60 has side ends facing in the transport direction X, which are in contact with the inner side surfaces of the mist introducing box 45.

The mist introducing box 45 has the collecting box 47 attached to a lower part thereof. The collecting box 47 has flanges 61 formed thereon. The flanges 61 are formed by bending upper ends of side panels 63 of the collecting box 47 horizontally outward. The flanges 61 are formed to surround peripheries of the collecting box 47 in plan view. The side panels 63 are in approximately vertical position along the height direction Z. The collecting box 47 has seal members 65. The seal members 65 are attached to upper surfaces of the flanges 61. The seal members 65 have elasticity. The seal members 65 are material that can seal ink. The seal members 65 maintain the mist collecting unit 25 liquid-tight.

In the state of being attached to the mist introducing box 45, the collecting box 47 has a bottom thereof from which the lower end of the introduction pipe 43 is spaced away. The lower end of the introduction pipe 43 is located adjacent the bottom of the collecting box 47 in the height direction Z rather than the horizontal plate 57 of the mist introducing box 45. The suspended plate 60 noted above has a lower end thereof located in nearly the same position in the height direction Z as the lower end of the introduction pipe 43. The suspended plate 60 does not form gaps with inner side surfaces of the collecting box 47 when seen from the width direction Y. In other words, the suspended plate 60 has side ends facing in the transport direction X, which are in contact with the inner side surfaces of the collecting box 47.

The collecting box 47 has an upstanding plate 67. The collecting box 47 has the upstanding plate 67 attached to the bottom thereof. The upstanding plate 67 projects to the space SP. The upstanding plate 67 is located between the introduction pipe 43 and suspended plate 60 in the width direction Y. More particularly, the upstanding plate 67 is located in a position closer to the introduction pipe 43 than to the suspended plate 60 in the width direction Y. The upstanding plate 67 has an upper end thereof which is equal in height to the side panels 63 of the collecting box 47, for example. In other words, the upstanding plate 67 has the upper end thereof contained in the collecting box 47. The upstanding plate 67 has the upper end which is higher than the lower end of the suspended plate 60. In other words, the suspended plate 60 has the lower end whose height is lower than the height of the upstanding plate 67. The height of the upper end of the upstanding plate 67 is also higher than the height of the lower end of the introduction pipe 43. The side panels 63 of the collecting box 47 correspond to one form of the "inner surfaces of the collecting box" in this invention, and this applies also to the upstanding plate 67.

<2-1. Preferred Example of Dimensions>

Next, an example of dimensions will be described about the outer side surfaces of the introduction pipe 43 and surrounding structures.

Here, distance d is assumed to be the distance between the outer side surfaces of the introduction pipe 43 and those inner side surfaces facing and opposed to the outer side surfaces of the introduction pipe 43, among the inner side surfaces of the collecting box 47. In FIG. 4, distance d is also assumed to be the distance between the inner side surfaces of the collecting box 47 and the outer side surfaces of the introduction pipe 43 arranged in the transport direction X. Further, in this embodiment, distance d is assumed to be the distance between the side surface of the upstanding plate 67 opposed to the introduction pipe 43 and the outer surface of the introduction pipe 43. The distance between the lower end of the introduction pipe 43 and the bottom of the collecting box 47 is assumed to be d1. In this case, it is preferred that the collecting box 47 is configured to provide the following relational expression for distance d:

$$\text{distance } d=k\cdot d1$$

Sign k in the above equation is a coefficient. Coefficient k is in a range of 1.5 to 2.5, for example. Preferably, k=2.

According to Inventors' experiments and simulations, the collecting box 47 is constructed with distance d fulfilling the above relational expression. It has been found that this collecting box 47 can easily capture the mist as concerns gas currents introduced through the introduction pipe 43 and flowing upward to spread around from the bottom of the collecting box 47. That is, the construction in the dimensions fulfilling the above mathematical expression has proved capable of efficiently collecting the mist in the collecting box 47.

The upstanding plate 67 noted above corresponds to the "first member" in this invention. The suspended plate 60 noted above corresponds to the "second member" in this invention.

<2-2. Attachment and Detachment Construction>

Figure 5:
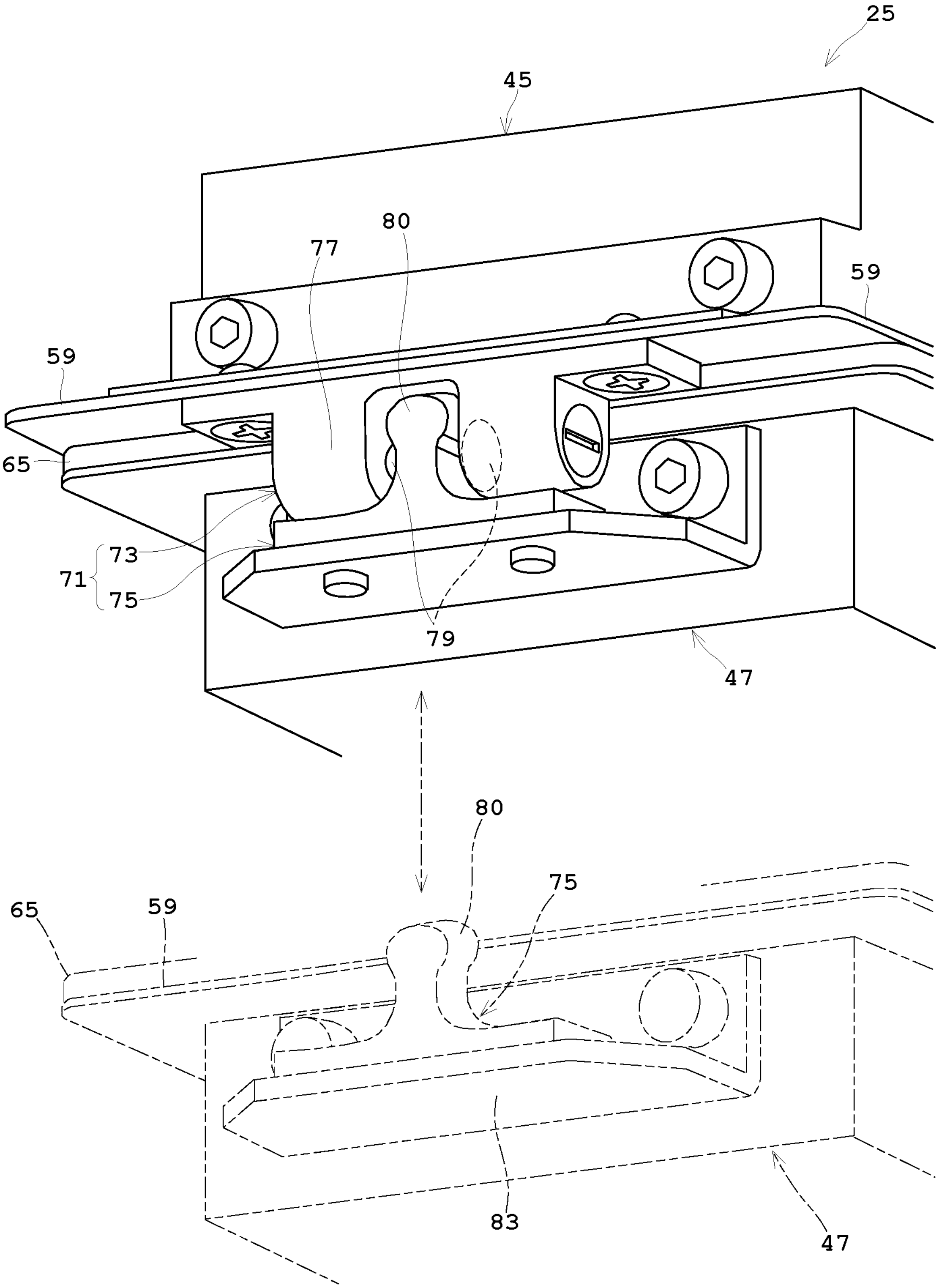
FIG. 5 is a perspective view showing an attachment and detachment construction of a collecting box.

Reference is now made to FIG. 5. FIG. 5 is a perspective view showing an attachment and detachment construction of the collecting box.

Preferably, the collecting box 47 has the following attachment and detachment construction.

It is preferred that the collecting box 47 is attachable to and detachable from the mist introducing box 45 attached to the unit frame 23. This is because the collecting box 47 is detached in order to remove collected mist. Ball catches 71 are attached to opposite ends in the width direction Y. These have the same construction. So, the ball catch 71 adjacent the other end (adjacent the introduction pipe 43) in the width direction Y will be taken for example to describe the construction in detail.

Specifically, the collecting box 47 is detachably attached to the mist introducing box 45 with the ball catches 71. Each ball catch 71 includes a female part 73 and a male part 75. The female part 73 has a female part body 77 and a pair of spherical members 79.

The female part 73 is constructed to have the pair of spherical members 79 arranged opposite each other in a recess of the female part body 77. The spherical members 79 are biased toward the center of the recess. The spherical members 79 are mounted to be movable back and forth relative to the recess. The spherical members 79 are spaced from each other across the recess. In this embodiment, the female part 73 is attached to the mist introducing box 45. More particularly, the female part 73 is attached to the horizontal plate 57 adjacent the one end in the width direction Y. The female part 73 is attached to a lower surface of the extension 59 adjacent the other end in the width direction Y.

In this embodiment, the male part 75 is attached to the collecting box 47. The male part 75 includes an engaging member 80 for engaging with the recess of the female part 73. Adjacent the one end in the width direction Y, the male part 75 is mounted on an L-plate 81. The L-plate 81 is attached to the outer side surface of the side panel 63 of the collecting box 47. Adjacent the other end in the width direction Y, the male part 75 is mounted on an L-plate 83. The L-plate 83 is attached to the outer side surface of the side panel 63 of the collecting box 47.

The ball catches 71 described above allow the collecting box 47 to be easily attached to and detached from the mist introducing box 45. Consequently, maintenance can be carried out easily. Further, since the hose 29 is attached to the mist introducing box 45 fixed to the unit frame 23, there is no trouble of attaching and detaching the hose 29, and only the collecting box 47 can be attached and detached with ease.

<3. Flow of Gas in Mist Collecting Unit>

Figure 6:
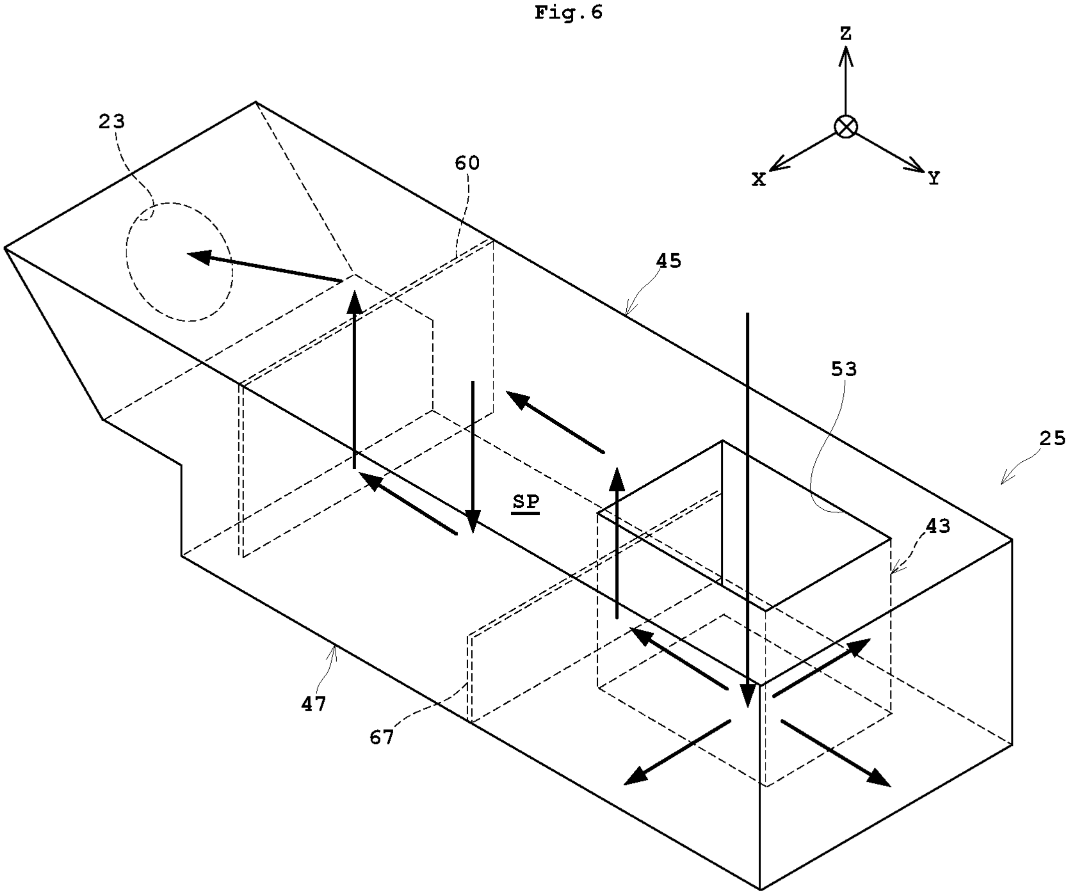
FIG. 6 is a schematic view showing flows of gas in the mist collecting unit.

Reference is now made to FIGS. 3 and 6. FIG. 6 is a schematic view showing flows of the gas in the mist collecting unit. Assume that printing is performed under control of the controller 31 and that suction is provided by the fan box 27.

The air including mist of the inks is sucked into the mist collecting unit 25 through the through hole 41, opening 37, and introduction hole 53, and exhausted into the fan box 27 through the suction port 49 and hose 29. At this time, in the mist collecting unit 25, as shown in FIG. 6, the air flows from the introduction hole 53 to the suction port 49.

The air which has flowed down the introduction hole 53 in the height direction Z collides with the bottom of the collecting box 47 at the lower end of the introduction pipe 43. The air can rapidly change to the horizontal direction. The air is turned to all circumferential directions at the lower end of the introduction pipe 43. The air turned to all circumferential directions collides with three of the inner side surfaces of the collecting box 47 and with the upstanding plate 67. The air can be rapidly changed to the height direction Z by the three of the inner side surfaces of the collecting box 47 and by the upstanding plate 67. The air moves in the width direction Y while being pulled by suction power from the suction port 49. The air is turned by the suspended plate 60 downward in the height direction Z. The air collides with the bottom of the collecting box 47. The air passes under the lower end of the suspended plate 60, and collides with the inner side surface of the side panel 63 of the collecting box 47. The air moves up in the height direction Z to be exhausted from the suction port 49.

According to this embodiment, the mist included in the gas introduced from the lower end of the introduction pipe 43 is captured by the bottom of the collecting box 47, and by the inner surfaces of the collecting box 47 existing in the entire circumference of the introduction pipe 43 in plan view. Consequently, since the capturing area can be increased as compared with the conventional area, the mist can be captured in a thin large area. Since the flow path is restrained from becoming narrow, the flow rate of the air stream can be maintained substantially constant. As a result, mist collecting efficiency can be maintained over a long period of time.

With the upstanding plate 67 and suspended plate 60 arranged in the space SP, the upstanding plate 67 and suspended plate 60 can further capture the mist by the time the air stream arrives at the suction port 49. Thus, the mist collecting efficiency can be further improved.

Modified Examples

Figure 7:
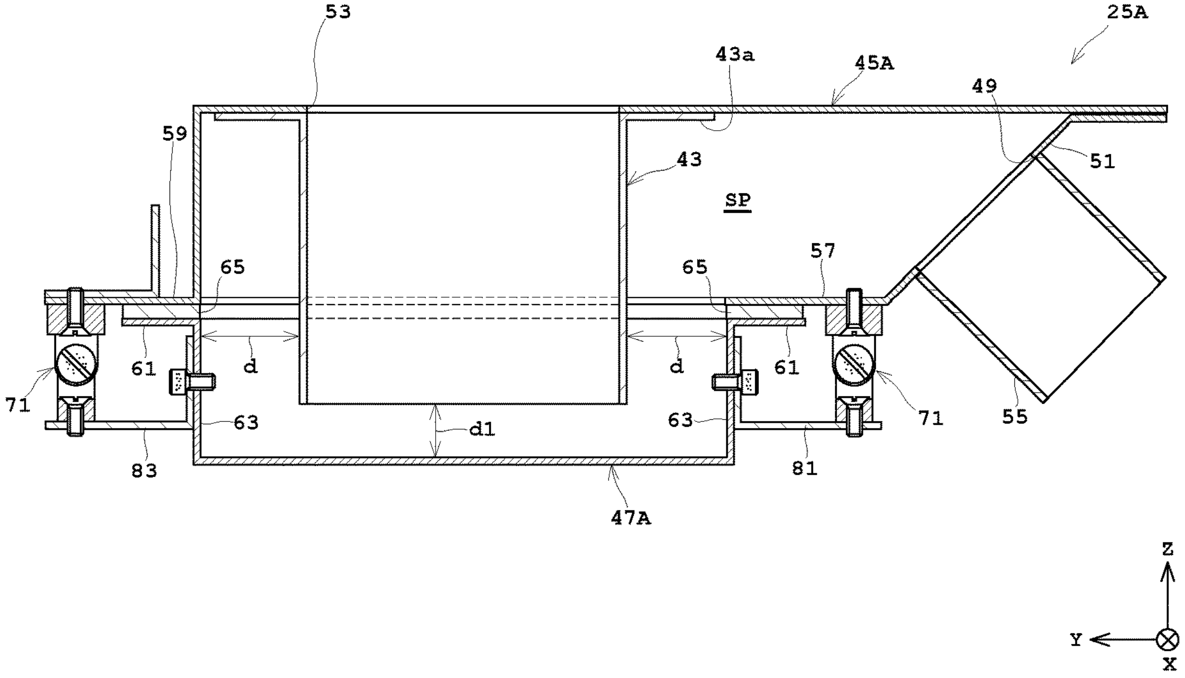
FIG. 7 is a view in vertical section showing a modified example of the mist collecting unit.

Reference is made to FIG. 7. FIG. 7 is a view in vertical section showing a modified example of the mist collecting unit.

A mist collecting unit 25A according to the modified example has an introduction pipe 43, a mist introducing box 45A, and a collecting box 47A. Components identical to those of the foregoing embodiment are shown with the same signs, and will not particularly be described.

The mist collecting unit 25A is constructed to omit the suspended plate 60 and upstanding plate 67 in the foregoing embodiment. In connection with this, the mist introducing box 45A and collecting box 47A have shortened lengths in the width direction Y. However, distance d between the side panels 63 of the collecting box 47A and the outer side surfaces of the introduction pipe 43 is maintained to provide the dimensional relationship described hereinbefore.

According to this modified example, the mist collecting efficiency can be maintained over a long period of time as in the foregoing embodiment. Moreover, the dimensions in the width direction Y can be shortened. It is also possible to employ even a compact inkjet printing system 1 with the short length in the width direction Y of the print heads 21.

Figure 8:
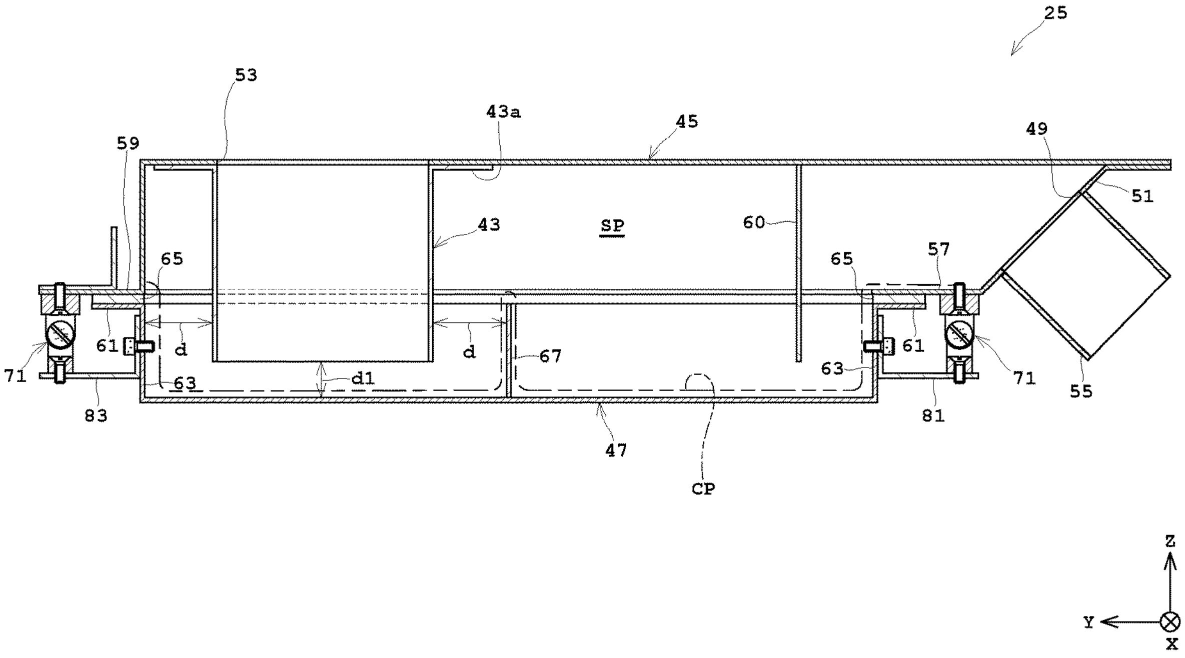
FIG. 8 is a view in vertical section showing a state where a sheet of paper is provided.

It is preferred that the above mist collecting unit 25 employs a construction shown in FIG. 8.

Reference is made to FIG. 8. FIG. 8 is a view in vertical section showing a state where a sheet of paper is provided.

The mist collecting unit 25 has the collecting box 47 removed from the mist introducing box 45 for a cleaning operation, and the collecting box 47 is thereafter attached to the mist introducing box 45 again. A sheet of paper CP is therefore spread over an entire floor area of the collecting box 47. It is preferable to apply such sheets of paper CP to all the locations subject to adhesion of the mist, instead of limiting this measure to the collecting box 47. The sheet of paper CP may be a material permeable to ink. With this construction, the collecting box 47 can be cleaned quickly by changing the sheets of paper CP. Consequently, maintenance can be carried out in a short time.

This invention is not limited to the foregoing embodiment, but may be modified as follows:

(1) In the foregoing embodiment, distance d of the inner side surfaces of the collecting box 47 from the opposed, outer side surfaces of the introduction pipe 43 fulfills the relationship expressed in distance d=k d1. However, this invention does not require such dimensions as indispensable.

(2) The foregoing embodiment provides a construction for facilitating attachment and detachment of the collecting box 47 and mist introducing box 45 by means of the ball catch 71. However, this invention is not limited to such construction. For example, a draw latch may be employed instead of the ball catch 71. Further, the construction for facilitating attachment and detachment is not limitative. For example, bolts and nuts may be used for attachment.

(3) In the foregoing embodiment, the mist collecting unit 25 is located on the left side in the width direction Y as seen from upstream in the transport direction X. However, this invention is not limited to such arrangement. That is, as long as air streams including the mist can be sucked, the mist collecting unit 25 may be located anywhere.

(4) In the foregoing embodiment, the mist introducing box 45 includes the side panel 51 having a sloping surface with the suction port 49 formed therein. However, this invention does not require the suction port 49 formed in the sloping surface to be indispensable. If there is no drawback in connecting with the hose 29 or in suction, the suction port 49 may be located in various positions in the mist introducing box 45. For example, the side panel 51 may be made vertical in position along the height direction Z, with the suction port 49 formed in this side panel 51, to effect suction horizontally in the width direction through the exhaust hose 29.

(5) The foregoing embodiment has been described taking the web paper WP as an example of printing media. However, this invention is not limited to the web paper WP as printing medium. Examples of printing media include plastic film, and sheet-fed paper.

This invention may be embodied in other specific forms without departing from the spirit or essential attributes thereof and, accordingly, reference should be made to the appended claims, rather than to the foregoing specification, as indicating the scope of the invention.

What is claimed is:

1. A mist collecting unit for collecting a mist of ink droplets, the mist collecting unit comprising:
- a hollow introduction pipe for introducing a gas including the mist;
- a mist introducing box including an open bottom, and a suction port formed adjacent one end in a longitudinal direction thereof, with the introduction pipe mounted adjacent the other end in the longitudinal direction to have an upper part opening in a ceiling plane; and
- a collecting box attached to a lower part of the mist introducing box to have an open ceiling surface, a bottom spaced from a lower end of the introduction pipe, and inner side surfaces spaced from outer side surfaces of the introduction pipe,
- wherein the gas is introduced from the introduction pipe into the collecting box by sucking internal atmosphere of the mist introducing box and the collecting box from the suction port, thereby capturing the mist included in the gas by inner surfaces of the collecting box,
- wherein the introduction pipe elongates downward from the ceiling plane of the mist introducing box into a space formed by the mist introducing box and the collection box, and
- wherein the introduction pipe has an opening downward, the opening being higher than the bottom of the collection box.

2. The mist collecting unit according to claim 1, further comprising:
- the space formed by the mist introducing box and the collecting box between an outer surface adjacent the suction port in the longitudinal direction, among the outer surfaces of the introduction pipe, and the suction port;

a first member erected in the space; and a second member located in the space closer in the longitudinal direction to the suction port than the first member;

wherein the first member is provided in a state that a side surface thereof is spaced from an outer surface of the introduction pipe and a height of an upper end of the first member is higher than a height of the lower end of the introduction pipe, and is provided on the bottom of the collecting box to have an upper end thereof spaced from the ceiling plane of the mist introducing box; and the second member is suspended from the ceiling plane of the mist introducing box to have a lower end thereof spaced from the bottom of the collecting box, and a height of the lower end lower than the height of the upper end of the first member.

3. The mist collecting unit according to claim 2, wherein a distance d between the outer surface of the introduction pipe and an inner surface of the collecting box opposed to the outer surface of the introduction pipe, and the distance d in the longitudinal direction between the outer surface of the introduction pipe and the first member, is distance d=2·d1, where d1 is an interval between the lower end of the introduction pipe and the bottom of the collecting box.

4. The mist collecting unit according to claim 3, wherein the collecting box is attachable to and detachable from the mist introducing box by a ball catch, the ball catch including a female part having a pair of biased spherical members arranged opposite each other in a recess, and a male part having an engaging member for engaging the recess.

5. The mist collecting unit according to claim 4, wherein the collecting box has sheets of paper spread to cover a bottom surface and side surfaces thereof.

6. The mist collecting unit according to claim 3, wherein the collecting box has sheets of paper spread to cover a bottom surface and side surfaces thereof.

7. The mist collecting unit according to claim 2, wherein the collecting box is attachable to and detachable from the mist introducing box by a ball catch, the ball catch including a female part having a pair of biased spherical members arranged opposite each other in a recess, and a male part having an engaging member for engaging the recess.

8. The mist collecting unit according to claim 7, wherein the collecting box has sheets of paper spread to cover a bottom surface and side surfaces thereof.

9. The mist collecting unit according to claim 2, wherein the collecting box has sheets of paper spread to cover a bottom surface and side surfaces thereof.

10. The mist collecting unit according to claim 1, wherein a distance d between the outer surface of the introduction pipe and an inner surface of the collecting box opposed to the outer surface of the introduction pipe is distance d=2·d1, where d1 is an interval between the lower end of the introduction pipe and the bottom of the collecting box.

11. The mist collecting unit according to claim 10, wherein the collecting box is attachable to and detachable from the mist introducing box by a ball catch, the ball catch including a female part having a pair of biased spherical members arranged opposite each other in a recess, and a male part having an engaging member for engaging the recess.

12. The mist collecting unit according to claim 11, wherein the collecting box has sheets of paper spread to cover a bottom surface and side surfaces thereof.

13. The mist collecting unit according to claim 10, wherein the collecting box has sheets of paper spread to cover a bottom surface and side surfaces thereof.

14. The mist collecting unit according to claim 1, wherein the collecting box is attachable to and detachable from the mist introducing box by a ball catch, the ball catch including a female part having a pair of biased spherical members arranged opposite each other in a recess, and a male part having an engaging member for engaging the recess.

15. The mist collecting unit according to claim 14, wherein the collecting box has sheets of paper spread to cover a bottom surface and side surfaces thereof.

16. The mist collecting unit according to claim 1, wherein the collecting box has sheets of paper spread to cover a bottom surface and side surfaces thereof.

17. An inkjet printing apparatus for performing printing on a printing medium by dispensing ink droplets thereto, the apparatus comprising:

transport rollers for transporting the printing medium;

print heads for dispensing the ink droplets to the printing medium transported by the transport rollers; and a mist collecting unit disposed at an end of each of the transport rollers for collecting mist accompanying the ink droplets dispensed from each of the print heads, the mist collecting unit including:

a hollow introduction pipe for introducing a gas including the mist;

a mist introducing box including an open bottom, and a suction port formed adjacent one end in a longitudinal direction thereof, with the introduction pipe mounted adjacent the other end in the longitudinal direction to have an upper part opening in a ceiling plane; and a collecting box attached to a lower part of the mist introducing box to have an open ceiling surface, a bottom spaced from a lower end of the introduction pipe, and inner side surfaces spaced from outer side surfaces of the introduction pipe, wherein the gas is introduced from the introduction pipe into the collecting box by suction from the suction port, thereby capturing the mist included in the gas by inner surfaces of the collecting box, wherein the introduction pipe elongates downward from the ceiling plane of the mist introducing box into a space formed by the mist introducing box and the collection box, and wherein the introduction pipe has an opening downward, the opening being higher than the bottom of the collection box.

18. The inkjet printing apparatus according to claim 17, wherein, when the printing medium of various width dimensions is transported in a state of one end in a width direction of the printing medium is close to one end in a longitudinal direction of the transport roller acting as reference, the mist collecting unit is located adjacent the other end of the transport roller.

19. The inkjet printing apparatus according to claim 18, wherein, when the printing medium of maximum width is transported in plan view, the mist collecting unit has at least part of the introduction pipe located outward of the end of the printing medium adjacent the other end.

20. A mist collecting unit for collecting a mist of ink droplets, the mist collecting unit comprising:

an introduction pipe for introducing a gas including the mist;

a mist introducing box including an open bottom, and a suction port formed adjacent one end in a longitudinal direction thereof, with the introduction pipe mounted adjacent the other end in the longitudinal direction to have an upper part opening in a ceiling plane;

a collecting box attached to a lower part of the mist introducing box to have an open ceiling surface, a bottom spaced from a lower end of the introduction pipe, and inner side surfaces spaced from outer side surfaces of the introduction pipe;

a space defined by the mist introducing box and the collecting box between an outer surface adjacent the suction port in the longitudinal direction, among the outer surfaces of the introduction pipe, and the suction port;

a first member erected in the space; and a second member located in the space closer in the longitudinal direction to the suction port than the first member, wherein the first member is provided in a state that a side surface thereof is spaced from an outer surface of the introduction pipe and a height of an upper end of the first member is higher than a height of the lower end of the introduction pipe, and is provided on the bottom of the collecting box to have an upper end thereof spaced from the ceiling plane of the mist introducing box, the second member is suspended from the ceiling plane of the mist introducing box to have a lower end thereof spaced from the bottom of the collecting box, and a height of the lower end lower than the height of the upper end of the first member, and wherein the gas is introduced from the introduction pipe into the collecting box by sucking internal atmosphere of the mist introducing box and the collecting box from the suction port, thereby capturing the mist included in the gas by inner surfaces of the collecting box.

* * * * *